United States Patent
Ikeda

(10) Patent No.: US 12,062,772 B2
(45) Date of Patent: Aug. 13, 2024

(54) MANUFACTURING METHOD AND TESTING METHOD FOR POSITIVE ACTIVE MATERIAL MIXTURE

(71) Applicant: Prime Planet Energy & Solutions, Inc., Tokyo (JP)

(72) Inventor: Takenori Ikeda, Owariasahi (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 482 days.

(21) Appl. No.: 17/557,073

(22) Filed: Dec. 21, 2021

(65) Prior Publication Data
US 2022/0255052 A1 Aug. 11, 2022

(30) Foreign Application Priority Data
Feb. 8, 2021 (JP) .................. 2021-018478

(51) Int. Cl.
| | |
|---|---|
| H01M 4/04 | (2006.01) |
| H01M 4/02 | (2006.01) |
| H01M 4/36 | (2006.01) |
| H01M 4/525 | (2010.01) |
| H01M 10/0525 | (2010.01) |

(52) U.S. Cl.
CPC ....... *H01M 4/0435* (2013.01); *H01M 4/0404* (2013.01); *H01M 4/366* (2013.01); *H01M 4/525* (2013.01); *H01M 10/0525* (2013.01); *H01M 2004/021* (2013.01); *H01M 2004/028* (2013.01)

(58) Field of Classification Search
CPC .. H01M 4/0435; H01M 4/0404; H01M 4/366; H01M 4/525; H01M 10/0525; H01M 2004/021; H01M 2004/028; H01M 4/131; H01M 4/1391; H01M 4/623; H01M 4/625; H01M 4/04; H01M 4/02; Y02E 60/10

See application file for complete search history.

(56) References Cited

U.S. PATENT DOCUMENTS

| | | | |
|---|---|---|---|
| 2011/0013835 A1 | 1/2011 | Eguchi et al. | |
| 2020/0023327 A1 | 1/2020 | Ikeda | |
| 2022/0111344 A1 | 4/2022 | Ikeda | |

FOREIGN PATENT DOCUMENTS

| | | |
|---|---|---|
| CN | 110935337 A | 3/2020 |
| JP | 18271402 A | 10/1996 |
| JP | 2005126281 A | 5/2005 |
| JP | 201038614 A | 2/2010 |

(Continued)

*Primary Examiner* — Helen Oi K Conley
(74) *Attorney, Agent, or Firm* — HAUPTMAN HAM, LLP

(57) ABSTRACT

A manufacturing method and a testing method for a positive active material mixture to manufacture the positive active material mixture as a mixture of a positive active material, a conductive material, and a disperse medium by mixing positive active material particles, conductive material particles, and the disperse medium, pressing to form a pressed surface by pressing a resultant product of the mixing by a pressure member, disperse-degree obtaining to obtain the disperse degree of the positive active material particles and the conductive material particles on the pressed surface, and determining to determine success and failure in the disperse degree obtained in the disperse-degree obtaining, the resultant product is taken as the positive active material mixture when a determination result of the determining is success, and the resultant product is taken back to the mixing when the determination result of the determining is failure.

7 Claims, 2 Drawing Sheets

(56) References Cited

FOREIGN PATENT DOCUMENTS

| | | |
|---|---|---|
| JP | 2012145508 A | 8/2012 |
| JP | 202013681 A | 1/2020 |
| JP | 2020140793 A | 9/2020 |
| WO | 2009116359 A1 | 9/2009 |

MANUFACTURING METHOD AND TESTING METHOD FOR POSITIVE ACTIVE MATERIAL MIXTURE

CROSS-REFERENCE TO RELATED APPLICATIONS

This application is based upon and claims the benefit of priority from the prior Japanese Patent Application No. 2021-018478, filed Feb. 8, 2021, the entire contents of which are incorporated herein by reference.

BACKGROUND

Technical Field

The present disclosure relates to a manufacturing method and a testing method for a positive active material mixture.

Background Art

For manufacturing a positive electrode plate of a battery, there is used a positive active material mixture in which a positive active material, a conductive material, and a disperse medium are mixed. The positive active material mixture is generally manufactured by mixing a particulate positive active material and a particulate conductive material together with the disperse medium. The positive active material mixture as a mixture of two types of particles and one liquid is required to be in a state where positive active material particles and conductive material particles are well dispersed with no composition unevenness. Accordingly, it is necessary to evaluate a disperse degree in manufacturing the positive active material mixture.

As a conventional technique used for evaluation, a technique described in JP 2005-126281A has been known. In the document, amorphous silica has been prescribed its dispersity to water by its viscosity. Thus, the document states that amorphous silica which can produce slurry with low viscosity even at a high concentration is provided. The amorphous silica according to the document has the requirement that the viscosity of dispersion is a predetermined value or less.

SUMMARY

Problems to be Solved

When the above-mentioned conventional technique is to be applied to the positive active material mixture, there is the following problem. An object to be evaluated is limited to liquid or slurry. It is natural that the object requires fluidity since the technique is directed to measure the viscosity of the object. As the positive active material mixture for manufacturing a positive electrode plate, the mixture in slurry-state with fluidity may be utilized, but also wet powder with less fluidity is used. In recent years, utilizing the latter is being a mainstream for reducing a burden in a drying step. The wet powder is hard to be measured its viscosity, and thus it is not possible to evaluate a disperse degree by the viscosity.

The present disclosure has been made to solve the problem of the above-mentioned conventional technique. Specifically, the problem to be solved is, for a positive active material mixture, to provide a manufacturing method and a testing method in which a disperse degree is appropriately evaluated irrespective of presence or absence of fluidity and a mixture state with high uniformity is obtained.

Means for Solving the Problem

A manufacturing method for a positive active material mixture according to one aspect of the present disclosure is a manufacturing method for a positive active material mixture in which a positive active material, a conductive material, and a disperse medium are mixed, the method comprising: mixing to mix positive active material particles, conductive material particles, and the disperse medium; pressing to form a pressed surface pressed by a pressure member on a resultant product of the mixing; disperse-degree obtaining to obtain a disperse degree of the positive active material particles and the conductive material particles on the pressed surface, and determining to determine success and failure in the disperse degree that is obtained by the disperse-degree obtaining by use of a predetermined discriminant reference, wherein the resultant product is taken as the positive active material mixture when a determination result in the determining is success, and the resultant product is further taken back to the mixing when the determination result in the determining is failure.

In the manufacturing method for the positive active material mixture in the above-mentioned aspect, firstly, in the mixing, the positive active material particles, the conductive material particles, and the disperse medium are mixed. To this resultant product, the pressed surface is formed in the pressing. The disperse degree of mixing appears on this pressed surface of the resultant product. Then, the disperse degree is obtained in the disperse-degree obtaining and success or failure in dispersing is determined in the determining. Thereby, only the positive active material mixture having enough disperse degree can be presented to the following process, and the positive active material mixture with insufficient disperse degree can repeat the mixing.

In the manufacturing method for the positive active material mixture according to the above aspect, preferably, the disperse-degree obtaining is performed by: photographing to obtain an image when a light is irradiated on the pressed surface; and brightness-distribution obtaining to obtain a brightness distribution on the image obtained in the photographing, and the discriminant reference used in the determining is prescribed with respect to the brightness distribution on the image. Thus, obtention of the brightness distribution on the pressed surface can be appropriately performed.

In the manufacturing method for the positive active material mixture according to any one of the above-mentioned aspects, preferably, the pressing is performed by bringing the resultant product to pass through a pair of rollers of two rotation rollers and forming a flattened layer of the resultant product on one of the rotation rollers. In this manner, the surface of the flattened layer becomes the pressed surface, and accordingly, the disperse degree can be obtained.

In the aspect of performing the pressing by the pair of rollers, preferably, the flattened layer formed on the one rotation roller in the pressing is presented to the disperse-degree obtaining, and after that, collecting is performed to scrape and collect the flattened layer by a scraper. In this manner, collection of the positive active material mixture after the pressing is made easily.

A testing method for positive active material mixture according to another aspect of the present disclosure is a testing method for a positive active material mixture in which a positive active material, a conductive material, and a disperse medium are mixed, the method comprising: pressing to form a pressed surface pressed by a pressure member on the positive active material mixture which is obtained by mixing positive active material particles, conductive material particles, and the disperse medium, disperse-degree obtaining to obtain a disperse degree of the positive active material particles and the conductive material particles on the pressed surface, and determining to determine success and failure in the disperse degree obtained by the disperse-degree obtaining by use of a predetermined discriminant reference. In this manner, the positive active material mixture can be appropriately tested according to the disperse degree of the positive active material particles and the conductive material particles.

According to the present disclosure, there is provided a manufacturing method and a testing method for a positive active material mixture by which a disperse degree can be appropriately evaluated irrespective of presence or absence of fluidity and a highly-uniformed mixture state can be obtained.

DETAILED DESCRIPTION OF THE EXEMPLARY EMBODIMENTS

Hereinafter, an embodiment embodying the present disclosure is explained in detail with reference to the accompanying drawings. The present embodiment embodies the present disclosure in manufacturing a positive active material mixture for a positive electrode plate of a lithium-ion battery.

Solid components of raw material for the positive active material mixture in the present embodiment are particulate powder materials listed below.
- Active material: lithium nickel-manganese-cobalt-oxide (with a particle diameter of about 10 μm)
- Conductive material: acetylene black (with a particle diameter of about 3 to 5 nm)
- Binder resin: polyvinylidene fluoride
- Compounding ratio: active material/conductive material/binder resin=90/5/5 (weight percent)

In the above materials, the binder resin is to be dissolved into the disperse medium when the binder resin is mixed with the disperse medium. Accordingly, in the following explanation, the binder resin is deemed to be substantially included in the disperse medium. As the disperse medium, N-Methyl-2-pyrrolidone (NMP) is used, and a solid content ratio is prescribed as 6.4 weight percent. This value of the solid content ratio is enough for a mixture to become wet powder with less fluidity.

A process of manufacturing the positive active material mixture in the present embodiment is as follows.
(1) Preliminary mixing→(2) Dispersing→(3) Determining The preliminary mixing in (1) is a process of mixing a powdery material with a disperse medium by a mixer such as a planetary mixer. In this process, however, an object is powdery with less liquid components, and thus the object is not subjected to enough shear force. Accordingly, the process is not made enough to decompose a block-shaped condensed matter of particles existing in the object. A size of the condensed matter residing in the object after preliminary mixing is in the order of millimeter, and each condensed matter has different compounding ratio. Even one of the condensed matter has unevenness in the compounding ratio. Namely, dispersing is not sufficiently made.

Figure 1:
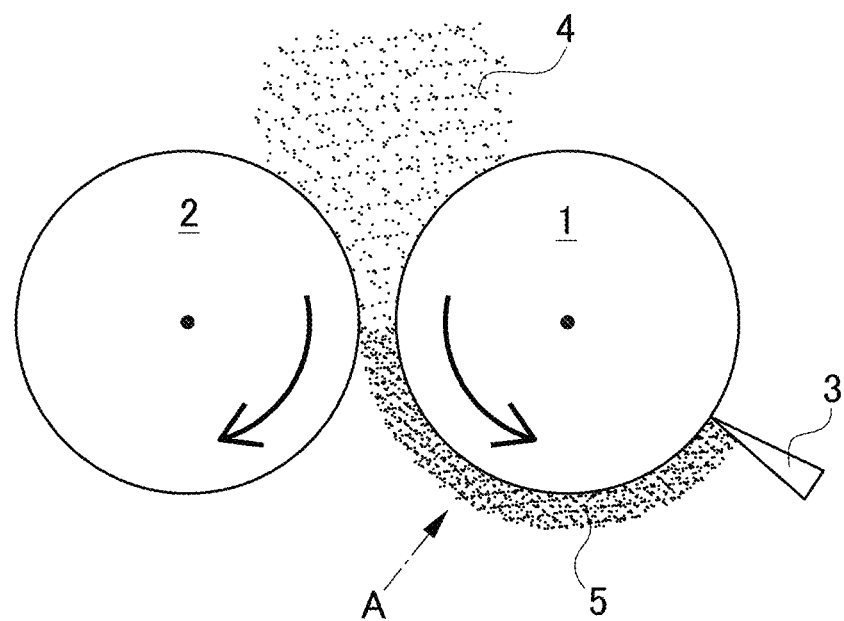
FIG. 1 is a schematic view of an apparatus performing a dispersing process (dispersing) in the present embodiment.

To address this, the dispersing in (2) is carried out. This process is a process to further disperse a resultant product after the above-mentioned preliminary mixing so that uniformity in compounding is improved. This process is, for example, carried out by an apparatus configured with two rollers as shown in FIG. 1. The apparatus shown in FIG. 1 includes a first roller 1 and a second roller 2 which are arranged in parallel. There is provided a certain gap in facing portions between the first roller 1 and the second roller 2. The first roller 1 is provided with a scraper 3.

When the dispersing process is to be performed by the apparatus in FIG. 1, from an upstream side of rotation of both the rollers with respect to the facing portions of the first roller 1 and the second roller 2, a resultant product 4 after the above-mentioned preliminary mixing is put in. The thus put resultant product 4 is dragged into the gap in the facing portions by rotation of both the rollers. By passing through the narrow gap, the resultant product 4 is pressed by both the rollers. Thus, the condensed matter in the resultant product 4 is sheared. Thus, dispersing of the resultant product 4 is facilitated, thereby improving uniformity in compounding. The first roller 1 and the second roller 2 are pressure members to press the resultant product 4.

The resultant product 4 having passed through the gap proceeds with forming a film-like flattened layer 5 on a surface of the first roller 1. The surface of the flattened layer 5 having passed through the gap is a smooth surface. This smooth surface is a pressed surface pressed by the second roller 2. The resultant product 4 formed into the flattened layer 5 is scraped off and collected from the first roller 1 by the scraper 3. The way of forwarding the resultant product 4 having passed through the gap only onto a surface of the first roller 1 but not on a surface of the second roller 2 is, for example, to make a moving speed of the perimeter of the first roller 1 faster than a moving speed of the perimeter of the second roller 2. Alternatively, the surface of the first roller 1 may have higher affinity with the resultant product 4 than the surface of the second roller 2.

Determining in (3) by use of the above-mentioned pressed surface is then performed. For this determining, an image of the pressed surface is obtained at a point indicated with an arrow A in FIG. 1 before the flattened layer 5 reaches the scraper 3. Photographing of the image may be performed by intentionally lighting up the surface of the flattened layer 5 or by irradiation of only natural light when the apparatus in FIG. 1 is set in a bright space.

The obtained image reflects the above-mentioned disperse situation in the flattened layer 5 of the resultant product 4. When the disperse situation is preferable, the entire image has almost uniform brightness, but when the dispersing is insufficient, the obtained image is as the one illustrated in FIG. 2 having unevenness in brightness. This is because the active material and the conductive material have different light reflection abilities. A region with much active material is reflected with much light and thus has high brightness, but a region with much conductive material is reflected with less light and thus has low brightness.

Figure 2:
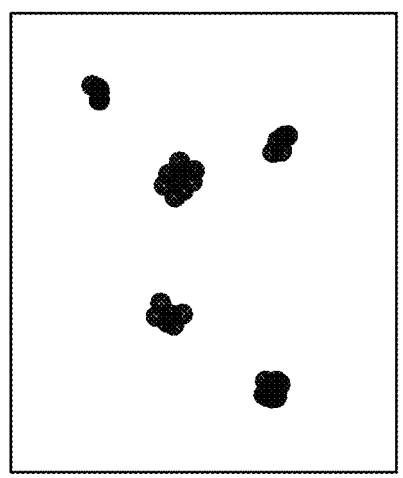
FIG. 2 is a diagram showing unevenness in brightness generated on an image with insufficient disperse.
Figure 3:
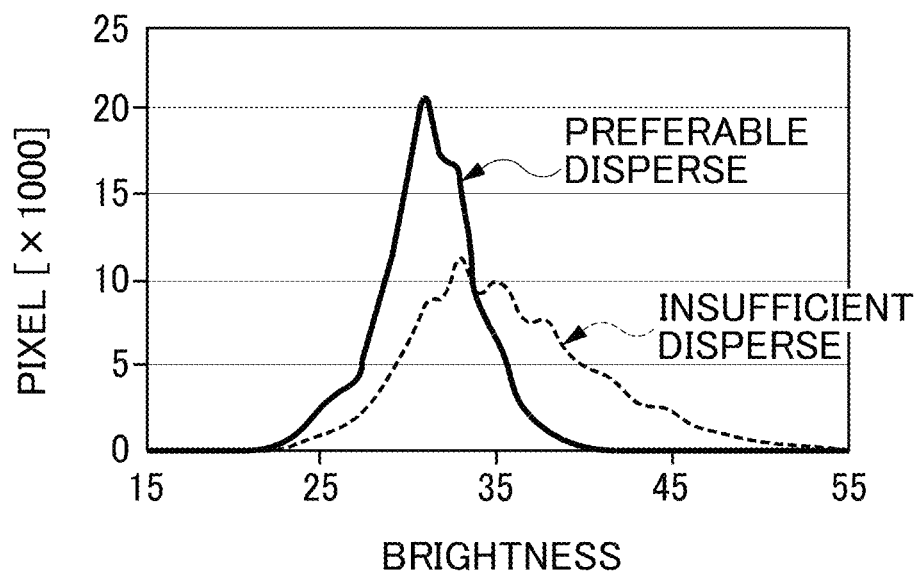
FIG. 3 is a graph showing one example of brightness distribution per each pixel in the image.

The example illustrated in FIG. 2 is a rather extreme example, and in actual cases, a level of unevenness in brightness is difficult to be evaluated by the bare eye. Accordingly, success and failure determination in the disperse degree is performed by image analysis. The image analysis is made by obtaining frequency distribution in brightness in each pixel included in the image. An example of a distribution graph is illustrated in FIG. 3. A brightness value on a lateral axis in FIG. 3 increases its number as the brightness becomes higher.

The example of FIG. 3 shows a case in which an area of 21.2 mm square is photographed under a condition of pixel density of 600 dpi and 256 grades in monochrome brightness scale. This pixel density is chosen such that a size of one pixel (in this example, about 42 μm) is made to be larger than a particle diameter of any one of the active material and the conductive material and made to be smaller than an allowable maximum size (about 80 μm) of a condensed matter of the conductive material at the time after the dispersing in (2).

As shown in FIG. 3, while a frequency distribution in the image that is obtained from the resultant product with preferable disperse degree has a high peak frequency in the distribution and a narrow distribution width, the frequency distribution in the image that is obtained from the resultant product with insufficient disperse degree has a low peak frequency in the distribution and the wide distribution width. In other words, while the preferable disperse degree results in small variation in the brightness, the insufficient disperse degree results in large variation in the brightness.

A plurality of mixtures (corresponding to the above resultant products 4) each having different disperse degree is fabricated, the above-mentioned frequency distribution is measured for each of the mixtures, an electrode plate is fabricated from each of the mixtures, and variations in the brightness and performance of the electrode plates are compared. Fabrication of the electrode plates is made by forming the mixture into a layer on a current collecting foil (an aluminum foil with a thickness of 12 μm). The performance of the electrode plates is evaluated by measuring an IV resistance of a small battery embedded with the thus formed electrode plate. The IV resistance was measured when two seconds has passed from start of discharging at a current corresponding to 7.5 C from the fully charged state. C represents a current value by which a battery is made to reach termination of discharge in an hour by constant-current discharge from a fully charged state. The temperature was −30° C. when the measurement was performed.

Figure 4:
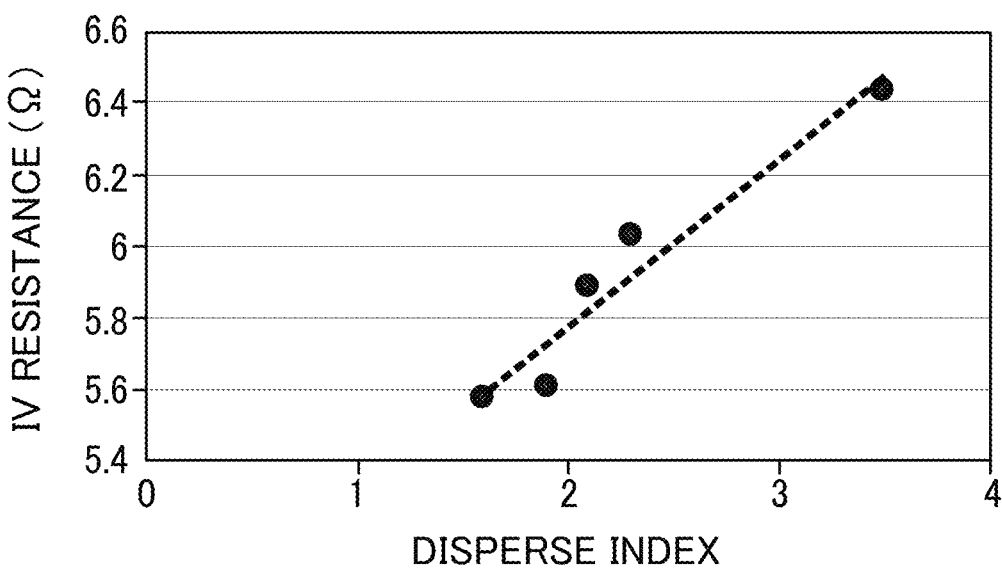
FIG. 4 is a graph showing a relationship between a disperse degree in a mixture and a battery performance.

FIG. 4 shows measurement results. "Disperse index" on a lateral axis in FIG. 4 represents a standard deviation in the frequency distribution of the brightness value shown in FIG. 3 which is obtained from photographed images from the respective mixtures. The larger the disperse index is, the larger the variation in the brightness is, and the less sufficient disperse state in the mixing is. The IV resistance on a vertical axis in FIG. 4 means that as the value is larger, the performance of the electrode plate is lower. According to FIG. 4, smaller disperse index (closer to a left side relative to the lateral axis) tends to have smaller IV resistance (closer to a lower side relative to the vertical axis). Accordingly, it has been confirmed that only an electrode plate with low performance can be obtained when the disperse state in the mixing is insufficient. This can be interpreted that an electrode layer fabricated from raw material of the mixtures with insufficient disperse has less conductive path in effect due to uneven distribution of the conductive material particles.

From these results, an imaginary lateral line can be drawn at a level of an allowable maximum IV resistance value in FIG. 4. A discriminant reference for judging success and failure may be determined by values of the disperse index corresponding to each intersection of the oblique line and the drawn imaginary lateral line. The discriminant reference has been thus prescribed, so that discrimination of success and failure can be made in any cases that the mixtures are manufactured under the same condition and are photographed under the same circumstances. The resultant product 4 is evaluated as success when the disperse index obtained from the photographed image on a smooth surface of the resultant product 4 after the dispersing in (2) goes below the reference value. When the disperse index obtained from the image exceeds the reference value, the resultant product 4 is evaluated as failure. This is the determining in the process (3). In this manner, the positive active material mixture is tested.

When a determination result is success, the resultant product 4 scraped off by the scraper 3 can be utilized as the positive active material mixture for manufacturing an electrode plate. Namely, manufacturing of the positive active material mixture has been made. When the determination result is failure, it is not recommended to use the resultant product 4 scraped off by the scraper 3 as it is as the positive active material mixture for manufacturing the electrode plate. In this case, the resultant product 4 is taken back to the processes of the mixing and the dispersing again. Thus, the dispersing is further facilitated, and therefore the failed product is expected to be evaluated as success in the next determination. When the determination result turns success, the resultant product 4 can be used for manufacturing the electrode plate as the positive active material mixture as similar with the above succeeded resultant product 4. Even in a case that the determination result is failure again, further mixing and dispersing can be repeated. The number of times of repetition may be limited or may not be limited.

The above-mentioned preliminary mixing in (1) and the dispersing in (2) are both included in a mixing process (the mixing). The dispersing in (2) is also a part of a pressing process (the pressing). When the determination result is failure and the product is taken back to the mixing again, both the preliminary mixing (1) and the dispersing (2) may by performed, or only the dispersing (2) may be performed. Obtention of an image in the determining in (3) is a photographing process (the photographing), and obtention of the frequency distribution of the brightness from the image is the brightness distribution obtention process. The photographing process and the brightness distribution obtention process are part of a disperse-degree obtaining process (the disperse-degree obtaining). Comparison of the reference value of the disperse index with the disperse index obtained from the image is a determining process (the determining). Scraping off the resultant product 4 of the flattened layer 5 by the scraper 3 is a collecting process (the collecting).

In the above explanation, the mixing process is divided into two stages, and the latter stage of them is combined to the pressing process. However, this combination of the processes is not prerequisite. The pressing process and the mixing process may be performed separately. In this case, the entire amount of the resultant products of the mixing process does not need to be presented to the pressing process, and an amount enough to form a pressed surface required for photographing may only be presented to the pressing process. For example, an appropriate amount of the resultant products may be contained in an appropriate container to be pressed by a pressure member having a flat surface.

As explained in detail above, according to the present embodiment, the mixture after the mixing process is formed with the pressed surface in the pressing process, and evaluated its disperse degree of mixing on the pressed surface. The determining process is performed based on this disperse degree, and thus the mixture with insufficient disperse degree may be taken back to the mixing process again. Thereby, a manufacturing method for manufacturing the positive active material mixture with preferable disperse degree is achieved. Further, a testing method for appropriately determining the disperse degree of the positive active material mixture is achieved.

The present embodiment is only an illustration and gives no limitation to the present disclosure. Accordingly, the present disclosure may naturally be made with various improvements and modifications without departing from the scope of technique. For example, types of components for the raw material of the positive active material mixture as an object may be any other substitutable types. The compounding ratio may not be the one as mentioned above.

Especially as for the ratios of solid components are not limited to the above-mentioned one which form wet powdery mixture and may be other ratios which form viscous mixture or paste-like mixture with certain fluidity. In a case of this solid component ratio with fluidity, the condensed matter in the mixture is subjected to the sear force in the mixing process and thus the matter tends to be well dissolved. However, the compounding ratio is not necessarily uniform over the entire mixture, and that is why application of the present disclosure is meaningful. In this case, however, the pressed surface is better to be dried after the pressing process and before photographing.

The disperse degree obtaining process may not be performed by obtention of an image. The process may be performed by color-irregularity evaluation by visual inspection of the pressed surface or roughness measurement of the pressed surface, as long as the disperse degree is evaluated with index by such means.

When the disperse degree obtention process is to be performed by obtaining an image, photographing is not limited to single monochrome photographing. The photographing may be monochromatic photographing with a specified color or polychromatic photographing. As for the brightness, various values related to the brightness may be used other than the usual brightness. For example, a brightness of the specified color may be used. Alternatively, hue or saturation in a color space in the polychromatic photographing may be used. As a disperse index, other than the above-mentioned standard deviation, other types of values such as dispersion, mean absolute deviation, and half-value width may be used.

REFERENCE SIGNS LIST

1 First roller
2 Second roller
3 Scraper
4 Resultant product
5 Flattened layer

What is claimed is:

1. A manufacturing method for a positive active material mixture in which a positive active material, a conductive material, and a disperse medium are mixed, the method comprising:
    mixing to mix positive active material particles, conductive material particles, and the disperse medium;
    pressing to form a pressed surface pressed by a pressure member on a resultant product of the mixing;
    disperse-degree obtaining to obtain a disperse degree of the positive active material particles and the conductive material particles on the pressed surface, and
    determining to determine success and failure in the disperse degree that is obtained by the disperse-degree obtaining by use of a predetermined discriminant reference, wherein
    the resultant product is taken as the positive active material mixture when a determination result in the determining is success, and the resultant product is further taken back to the mixing when the determination result in the determining is failure.

2. The manufacturing method for the positive active material mixture according to claim 1, wherein
    the disperse-degree obtaining is performed by:
        photographing to obtain an image when a light is irradiated on the pressed surface; and
        brightness-distribution obtaining to obtain a brightness distribution on the image obtained in the photographing, and
    the discriminant reference used in the determining is prescribed with respect to the brightness distribution on the image.

3. The manufacturing method for the positive active material mixture according to claim 1, wherein the pressing is performed by bringing the resultant product to pass through a pair of rollers of two rotation rollers and forming a flattened layer of the resultant product on one of the rotation rollers.

4. The manufacturing method for the positive active material mixture according to claim 3, wherein the flattened layer formed on the one rotation roller in the pressing is presented to the disperse-degree obtaining, and after that, collecting is performed to scrape and collect the flattened layer by a scraper.

5. A testing method for a positive active material mixture in which a positive active material, a conductive material, and a disperse medium are mixed, the method comprising:
    pressing to form a pressed surface pressed by a pressure member on the positive active material mixture which is obtained by mixing positive active material particles, conductive material particles, and the disperse medium,
    disperse-degree obtaining to obtain a disperse degree of the positive active material particles and the conductive material particles on the pressed surface, and
    determining to determine success and failure in the disperse degree obtained by the disperse-degree obtaining by use of a predetermined discriminant reference.

6. The manufacturing method for the positive active material mixture according to claim 2, wherein the pressing is performed by bringing the resultant product to pass through a pair of rollers of two rotation rollers and forming a flattened layer of the resultant product on one of the rotation rollers.

7. The manufacturing method for the positive active material mixture according to claim 6, wherein the flattened layer formed on the one rotation roller in the pressing is presented to the disperse-degree obtaining, and after that, collecting is performed to scrape and collect the flattened layer by a scraper.

* * * * *